United States Patent [19]
Wortham

[11] 3,843,701
[45] Oct. 22, 1974

[54] THE ALUMINUM SALT OF CINNAMOHYDROXAMIC ACID

[75] Inventor: Joseph S. Wortham, Lake City, Fla.

[73] Assignee: Allied Chemical Corporation, New York, N.Y.

[22] Filed: Sept. 12, 1972

[21] Appl. No.: 288,469

Related U.S. Application Data

[63] Continuation-in-part of Ser. No. 47,904, June 19, 1970, abandoned.

[52] U.S. Cl. ............ 260/448 R, 8/115.6, 260/429.7, 260/500 SH, 424/28, 424/76
[51] Int. Cl. .............................................. C07f 5/06
[58] Field of Search ................................ 260/448 R

[56] References Cited
UNITED STATES PATENTS

| | | | |
|---|---|---|---|
| 3,427,316 | 2/1969 | Wakeman et al. | 260/286 |
| 3,472,929 | 10/1969 | Jones et al. | 260/448 X |
| 3,511,864 | 5/1970 | Ugelow et al. | 260/448 |
| 3,520,911 | 7/1970 | Jones et al. | 260/448 |
| 3,523,130 | 8/1970 | Jones et al. | 260/448 |

FOREIGN PATENTS OR APPLICATIONS 729,204   12/1942   Germany

OTHER PUBLICATIONS

Kobashi et al., Biochem. Biophys. acta., 65:380–383, (1962), "Specific Inhibition of Urease by Hydroxamic Acids."

Fisboin et al., Nature, 208:46–48 Oct. 2, 1965, "Acetohydroxamate: Bacterial Urease Inhibitor With Therapeutic Potential On Hyperammonaemic States."

Kobashi et al., Biochem. Biophys. Res. Comm., 23(1):34–38, (1966), "Evidence for the Formation of An Inactive Urease Hydroxamic Acid Complex."

Chem. Abstracts, Vol. 52, pp. 6061h, 19699d, (1958).

Chem. Abstracts, Vol. 54, 6398f, (1960).

Chem. Abstracts, Vol. 55, 17366a, (1961).

*Primary Examiner*—Helen M. S. Sneed
*Attorney, Agent, or Firm*—Jay P. Friedenson

[57] ABSTRACT

A diaper treated with an hydroxamic acid in an amount sufficient to inhibit the decomposition of urea to ammonia when wetted with urine.

1 Claim, No Drawings

THE ALUMINUM SALT OF CINNAMOHYDROXAMIC ACID

CROSS-REFERENCE TO RELATED APPLICATIONS

This application is a continuation-in-part of the co-pending application in the name of the same inventor, Ser. No. 47,904, filed June 19, 1970, and entitled "Odor-Inhibiting Composition and Method" now abandoned.

BACKGROUND OF THE INVENTION

1. Field of the Invention

This invention relates to a diaper which is resistant to ammonia formation when wet with urine, thereby eliminating a cause of diaper rash, and the unpleasant odor of ammonia associated with the decomposition of urea.

2. Description of the Prior Art

Diaper rash is a common form of irritation and inflammation of the epidermal surfaces of an infant's body normally covered by a diaper. When a diaper is wet with urine, the urea contained in the fluid is not generally considered irritating, but as the urea decomposes due to the action of bacteria, ammonia is produced as a product of the decomposition. The ammonia, and the alkaline ammonium hydroxide are irritating to an infant's tender skin, which then becomes very susceptible to infection. Furthermore, the ammonia is the primary contributor to the unpleasant odor which develops when wet diapers are permitted to stand or are temporarily stored.

Heretofore, the general approach has been to employ germicides to destroy the bacteria responsible for the decomposition of the urea, but frequently the cure is almost as irritating as the ammonia it is meant to eliminate. Furthermore, the volume of urine is usually so great as to render safe quantities of germicides relatively ineffective. Furthermore, the destruction of the bacteria is not necessarily the best approach, for their ability to decompose organic waste matter serves a useful purpose in the ecological balance.

Until recent years it was assumed that the bacteria acted directly on the urea to bring about its decomposition, but it is now clear that the mechanism involves the production of the enzyme urease by the bacteria, and that it is ultimately the enzyme which brings about the decomposition of the urea.

The general approach heretofore has been to use a bactericide, sufficiently potent and in sufficiently large quantities to act on the bacteria and inhibit their ability to produce the enzyme.

SUMMARY OF THE INVENTION

I have now discovered that a diaper can be rendered resistant to ammonia odor formation, when wet with urine, by the incorporation of a small amount of an hydroxamic acid, insufficient to be effective as a bactericide, and of such trace amount as to have no harmful effect on the skin of an infant to which the diaper is applied. Not only is the formation of ammonia inhibited, but the incidence of the condition known as "diaper rash," frequently initiated by the irritating effect of ammonia, is greatly reduced.

In accordance with the present invention, the diaper comprises a urine-absorbent material containing at least one hydroxamic acid or salt of the acid, in an amount sufficient to inhibit the decomposition of urea to ammonia when wetted with urine. The preferred hydroxamic acids are those having the formula

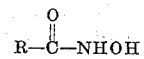

where R is an organic radical of one to 19 carbon atoms, desirably two to 10 carbon atoms, with the carbon atom of the acid radical bonded to a carbon atom of the organic radical.

The essential group in the compounds of the present invention is the

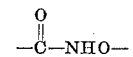

group. Accordingly, R in the above formula may be any compatible organic radical, preferably containing one to 19 carbon atoms, desirably two to 10 carbon atoms. The preferred radicals are aliphatic hydrocarbon radicals both substituted and unsubstituted, and cyclic hydrocarbon radicals, both substituted and unsubstituted.

The large number of hydroxamic acid compounds listed under "Description Of The Preferred Embodiment" are illustrative of the wide range of different organic radicals which may be combined with the above hydroxamic acid group.

Although very small quantities of these urease inhibiting compounds are effective and preferred, large quantities can be used if desired, but little benefit is gained thereby, for an important advantage of the method of the present invention lies in its economy. Since the hydroxamic acids may be applied to the diaper in substantially trace amounts, by very simple means, the method of the present disclosure provides an extremely low cost, yet highly effective operation.

DESCRIPTION OF THE PREFERRED EMBODIMENT

The present invention is directed to a diaper produced from natural materials such as cotton or paper (cellulosic), or from synthetics such as nylon or polyester, containing a small amount, preferably between 0.005 and 0.00002 grams of at least one hydroxamic acid or salt thereof. Among the applicable hydroxamic acid compounds are aceto—, propiono—, butyro—, capro—, heptylo—, octano—, nonylo—, caprino—, undecano—, phenylaceto—, benzo—, salicylo—, cinnamo—, adipo—, stearo—, and nicotino— hydroxamic acids, and the Al, Zn, Sn, Ca, Na, K and Mg salts of any of these.

The selected active hydroxamic acid compound can be applied to the diaper with a carrier such as water, or together with one or more carriers such as finely divided powders, water-soluble solids and volatile solvents or fluids which have no untoward effect on the skin of an infant wearing the diaper, yet are compatible with the hydroxamic acid compound being applied. Among the many carriers which may be employed either singly or in combination, for applying the active hydroxamic acid compound to the diaper, are water, starches, powdered talc, zinc stearate, water-soluble salts, ethanol, dioxane, formamide, glycerine cyclohexanol and a water-, oil- and strain- repellent composition comprising an aqueous emulsion containing a copolymer of fluoroisopropoxybutyl methacrylate and N—methylolacrylamide blended with 2—ethylhexamethacrylate. The number of suitable carriers is very considerable but water is the preferred carrier or solvent.

There are many different ways in which the hydroxamic acid compound and its carrier may be applied to the diaper. Preferably, the compound is applied as an aqueous solution in an amount sufficient to leave deposited on the diaper, between 0.005 and 0.00002 gram of the inhibiting hydroxamic acid compound. It may be applied to the dry diaper or to the damp diaper after laundering. It may be applied as a solution or as a spray. It may be applied in the final rinse of a wash cycle, or it may be incorporated into a softening agent for application to the diaper before drying. It may also be applied as a powder, preferably containing 0.01 to 2.0 grams per 1,000 grams of composition, or as a solution, when removing previously soiled diapers. It may be applied as an ingredient in a final wash phase in the laundering of the diapers, as a surface-applied spray, as a compact, water-soluble tablet containing 0.01 to 2.0 grams of inhibitor per 1,000 grams of composition for a final diaper rinse, or for diaper pails. When produced as a tablet, it may be formulated with a variety of water-soluble substances such as sodium sulfate, sodium carbonate, soap, detergents and soluble organic compounds such as malic acid. The inhibitor may also be applied as a surface coating for diapers, particularly of the disposable paper variety.

A convenient method of applying the inhibitor is by wetting the absorbent material with a composition consisting substantially of an aqueous solution of the hydroxamic acid compound containing about 0.005 to 2.0 grams of the compound per liter of water. If desired, the hydroxamic acid solution may be dried on the absorbent material, but this is not essential to the invention.

With one embodiment of the invention, the hydroxamic acid solution is adjusted to a pH of about 7 by the addition of an alkaline pH modifying substance.

EXAMPLE 1

A series of tests were run to illustrate the inhibiting effect of several different hydroxamic acids, using the following procedure:

"Birdseye" cotton diapers (Riegel Textile Corp.), and "Pampers" disposable diapers (Proctor and Gamble), each previously uniformly sprayed with an aqueous solution of a different one of the several hydroxamic acids listed in Table I below, and dried, according to the method of the present invention, were used in this test series.

A section of each diaper was taken, having an area selected to contain .00008 grams of the hydroxamic acid. The section generally varied between about 4 × 4 inches and 6 × 6 inches depending on the amount of inhibitor initially deposited on the diaper. Each section of diaper was placed in a 125cc Erlenmeyer flask. To each flask was added 24.9 ml of urine together with 0.1 ml of a solution of urease. The mouth of the flask was then sealed with wax paper, and incubated for 3 hours in a water bath at 37°C (body temperature). The urease solution referred to above is a commercially available extract of urease wih glycerol, obtainable from the Harleco Co. of Philadelphia.

A control flask was prepared and similarly treated with the exception that a section of diaper was used having an area comparable to that employed in the tests, but containing no hydroxamic acid inhibitor.

An aliguot portion of the contents of each flask was taken and analyzed for ammonia, the product of the action of the urease on the urea content of the urine. There are a variety of procedures for determining the ammonia, but the method here applied was that of Beecher and Whitten, Analy. Biochem. 36, 253, (1970).

An alternate analytical method was frequently applied as a check. In applying this test method, the quantity of urea originally present was determined, and compared with that remaining undecomposed at the end of the incubation period. The procedure used was the "Method for Determination of Urea," given by H. L. Rosenthal, Analy, Chem. 27, p. 1980, (1957).

This test was more time consuming than that for ammonia, but considered more precise since it was not subject to variations which might result from losses of ammonia. No significant losses were noted, hence, the method of Beecher and Whitten was found consistently reliable when checked against the method of Rosenthal.

In the tabulation to follow, the inhibitor tested as described above in given, followed by the micrograms of ammonia per ml found by analysis. The figure given is generally the average of several individual determinations. Finally, the "percent inhibition" is given.

percent inhibition = $A - B/A \times 100$ when $A$ = micrograms of ammonia ($NH_3$) per ml found in control containing no inhibitor, less the small amount of $NH_3$ normally found in the urine sample per ml, and $B$ = micrograms of $NH_3$ per ml found in test flask containing the inhibitor being evaluated, less the small amount of $NH_3$ normally found in the urine sample per ml.

Even in concentrations this low, where the amount of inhibitor used is only $3.2 \times 10^{-6}$ grams per ml of urine, the enzymatic action of the urease is inhibited to a considerable degree, as is evident in the following table:

TABLE I

Inhibiting Effect of Various Hydroxamic Acids
Incubation Period, 3 hours at 37°C.

| Inhibitor | Micrograms $NH_3$/ml urine | % Inhibition |
|---|---|---|
| Control | 1,470 | 0 |
| Heptylohydroxamic acid | 955 | 35 |
| Octanohydroxamic acid | 882 | 40 |
| Cinnamohydroxamic acid | 807 | 45 |
| Caprohydroxamic acid | 837 | 43 |

Among the many other hydroxamic acids exhibiting an inhibiting effect on the enzyme urease, are butyro—, benzo—, phenylaceto—, and nicotino—hydroxamic acids.

EXAMPLE 2

The following test illustrates the enzymatic action of the urease on the urea content of urine, and also the effect of doubling the quantity of hydroxamic acid inhibitor. The following procedure was used:

Into each of five numbered 50 cc Erlenmeyer flasks was inserted a 2 × 2 inches pad section cut from a "Pamper" disposable diaper. All of these pads were substantially aseptic except for that inserted into flask No. 3, which was first rubbed against the anal area.

24 ml of urine were now added to all five flasks. To flask No. 4 was added 0.4 ml of a solution of 0.02 gram of cinnamohydroxamic acid made up to 100 ml, and to flask No. 5, 0.8 ml of the same solution, thus flask No. 4 contained $8 \times 10^{-5}$ grams of cinnamohydroxamic acid and flask No. 5, $1.6 \times 10^{-4}$ grams.

Next, a 0.1 ml portion of the urease solution as defined in Example 1 was added to flasks No. 1, 4 and 5. All flasks were then made up to 25 ml, sealed with wax paper and incubated for 3 hours at 37° C. An aliquot portion of the contents of each flask was taken and tested for ammonia by the procedure given in Example 1. The results are tabulated in Table II below:

TABLE II

Inhibiting Effect of Cinnamohydroxamic Acid
Incubation Period, 3 Hours at 37°C.

| Flask No. | Inhibitor | Micrograms $NH_3$/ml Urine | Percent Inhibition |
|---|---|---|---|
| 1 | Control (urease, but no inhibitor, sterile pad) | 1135 | 0 |
| 2 | Control (no urease, no inhibitor, sterile pad) | 0 | 100 |
| 3 | Control (no urease, no inhibitor, contaminated pad) | 1132 | 0 |
| 4 | Cinnamohydroxamic acid $8 \times 10^{-5}$ gr. + urease + sterile pad | 670 | 41 |
| 5 | Cinnamohydroxamic acid $1.6 \times 10^{-4}$ gr. + urease + sterile pad | 303 | 73 |

In flask No. 1, as expected, the uninhibited urease decomposed the urea in the urine. Flask No. 2 dramatically demonstrates that when urease is absent, there is substantially no decomposition of the urea content of the urine even though there is no inhibitor present, and the urine has been incubated. This is in contrast with flask No. 3 which, like flask No. 2, contained neither inhibitor nor urease. There was no evidence of inhibition of the decomposition of urea in the case of flask No. 3 at all, yet the only difference was that the pad insert was not sterile. The probable answer is that the bacteria introduced with the contaminated pad produced the enzyme urease, just as they ordinarily do in the case of a wetted diaper. Since there was no inhibitor present, the urease produced in situ brought about the decomposition of the urea. Since urine is normally sterile, and the other additives in the test were substantially aseptic, the bacterium count was insufficient to produce an appreciable quantity of the enzyme.

Flask No. 4 containing both urease and $8 \times 10^{-5}$ grams of inhibitor, shows 41 percent inhibition whereas flask No. 5, wherein the quantity of inhibitor has been doubled, shows 73 percent inhibition. Doubling the quantity of the inhibitor in this instance resulted in an improvement of about 78 percent.

EXAMPLE 3

Various salts of several different hydroxamic acids were prepared as urease inhibitors for use in the example to follow. The method of preparing these salts follows the pattern here given for the preparation of the aluminum salt of cinnamohydroxamic acid.

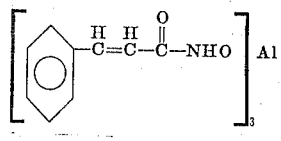

5 Grams of cinnamohydroxamic acid were dissolved in 30 ml of ethanol, and the stoichiometric amount of aluminum acetate was dissolved in 50 ml of water. The two solutions were mixed with stirring, and the white precipitate formed, was filtered off and washed with a small amount of cold water. The white product was dried under vacuum at room temperature.

Although quite pure, the product may be further purified by dissolving it in 50 cc of water acidified to pH 2.0 with HCl, filtering, reprecipitating, filtering off the precipitate, washing with cold water and drying under vacuum at room temperature.

| | Analysis | Theory |
|---|---|---|
| Carbon | 62.2 | 63.1 |
| Hydrogen | 4.8 | 4.7 |
| Oxygen | 18.6 | 18.7 |
| Nitrogen | 8.0 | 8.2 |
| Aluminum | 5.2 | 5.3 |

EXAMPLE 4

A series of tests were run on cinnamohydroxamic acid, benzohydroxamic acid and on a number of salts of these two acids, using the following procedure:

A 24 ml quantity of urine was placed in each of several 50 ml Erlenmeyer flasks, together with 0.4 ml of a solution of 0.02 gram of the selected acid made up to 100 ml with water, or of the acid salt made up to 100 ml with water acidified to pH 1 to 2 with HCl. An 0.1 ml portion of the urease solution, previously defined, was added to each mixture which was then brought to 25cc with water. The mouths of the flasks were sealed with wax paper, and the contents incubated in a constant temperature water bath for 3 hours at 37° C. Control flasks were prepared and similarly treated. These were identical in all respects, except that they did not contain inhibitor. An aliquot of each solution was taken and analyzed for ammonia as in Examples 1 and 2. The results are tabulated below in Table III:

TABLE III

Inhibiting Effect of Various Hydroxamic Acid Salts. Incubation Period, 3 hours at 37°C. Inhibitor $8.0 \times 10^{-5}$ grams/25 ml urine.

| Inhibitor | | Micrograms NH$_3$/ml. urine | % Inhibition |
|---|---|---|---|
| Control (no inhibitor) (Average) | | 1470 | 0 |
| Al salt, | Cinnamohydroxamic acid | 220 | 85 |
| Ca do. | do. | 352 | 76 |
| Zn do. | do. | 427 | 71 |
| Mg do. | do. | 646 | 56 |
| Na do. | do. | 882 | 40 |
| Sn do. | do. | 515 | 65 |
| Al do. | Benzohydroxamic acid | 1220 | 17 |
| Ca do. | do. | 369 | 75 |
| Zn do. | do. | 440 | 70 |
| Mg do. | do. | 265 | 82 |
| Na do. | do. | 1235 | 16 |
| Sn do. | do. | 545 | 63 |
| Cinnamohydroxamic acid (for comparison) | | 868 | 41 |
| Benzohydroxamic acid | do. | 1161 | 21 |

It will be noted from the above that generally speaking, with the possible exception of the salts of the alkali metals, the metallic salts are superior to the acids as urease inhibitors. It will also be noted that there is considerable variation in the effectiveness of the salts, with the aluminum salt of cinnamo-hydroxamic acid and the magnesium salt of benzohydroxamic acid being particularly outstanding. The calcium salts of both acids, it will also be noted, are high on the list of effective urease inhibitors.

EXAMPLE 5

A series of tests were run in the presence of a variety of solvents to determine the effect of the solvents on the inhibiting action of cinnamohydroxamic acid. The purpose of these tests was to determine whether the acid could be applied to the diaper as a solution in such solvents without detriment to its inhibiting action. Each test consisted of 23 ml of urine in a 50cc Erlenmeyer, 0.1 ml urease solution as previously defined, $1.6 \times 10^{-4}$ gr. cinnamo-hydroxamic acid, and 1.0 ml of the indicated solvent, with the mixture being made up to 25 ml with water. The cinnamohydroxamic acid concentration was identical in all tests. As before, the flasks were sealed with wax paper and incubated at 37° C for 3 hours. An aliquot portion was analyzed for urea according to the Rosenthal method of Example 1. A control was also prepared and treated in an identical manner, with the exception that it contained neither a solvent nor the cinnamohydroxamic acid inhibitor. The results are given below in Table IV:

TABLE IV

Effects of Various Solvents on the Urease Inhibiting Effect of Cinnamohydroxamic Acid

| Solvent | Mg. of Urea Degraded | % of Inhibition |
|---|---|---|
| Control (No cinnamohydroxamic Acid) | 4.00 | 0 |
| Water | 0.65 | 84 |
| Ethanol | 1.60 | 60 |
| Dioxane | 1.00 | 75 |
| Dimethylsulfoxide | 1.70 | 58 |
| Formamide | 1.50 | 63 |
| Glycerine | 1.70 | 58 |
| Cyclohexanol | 1.25 | 69 |
| Acrylic water, oil and stain repellent (previously defined) | 0.05 | 99 |

It will be noted that although some organic solvents tend to reduce the effectiveness of the inhibitor, they may if desired, be used without serious detriment. Water, and the aqueous emulsion of an acrylic stain repellent previously defined are outstanding solvents for the application of the inhibitor.

The results tabulated in Table IV appear higher than those given for cinnamohydroxamic acid in Tables I and II. This improvement in part reflects the larger quantity used. When $1.6 \times 10^{-4}$ grams of cinnamohydroxamic acid was used rather than $8 \times 10^{-5}$ as in Table I, the percent inhibition jumped from 41 percent to 73 percent. Furthermore, the results are affected by various factors, as for example the composition of the urine samples, the incubation period, the quantity of inhibitor used within the defined limits, the solvent used, and the hydroxamic acid compound employed.

The hydroxamic acids, and particularly the metallic salts of many of these acids have a high degree of potency as urease yet are substantially non-toxic; accordingly, very little of these substances need be added to the diapers, to render them resistant to ammonia production. The treatment accordingly is quite inexpensive.

These inhibiting substances are not appreciably volatile, and retain their efficacy for long periods of time. Of prime importance is the fact that these inhibitors minimize the production of diaper rash, and therefore those infections which frequently result from such ammonia induced irritation Since certain changes can be made in preparing and applying the compositions of this disclosure without departing from the scope of the invention, it is intended that all matter contained in the above description shall be interpreted as illustrative and not in a limiting sense.

I claim:
1. The aluminum salt of cinnamohydroxamic acid.

* * * * *